US009537842B2

(12) United States Patent
Stuntebeck

(10) Patent No.: US 9,537,842 B2
(45) Date of Patent: Jan. 3, 2017

(54) SECONDARY COMMUNICATIONS CHANNEL FACILITATING DOCUMENT SECURITY

(71) Applicant: AirWatch LLC, Atlanta, GA (US)

(72) Inventor: Erich Peter Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 78 days.

(21) Appl. No.: 14/580,717

(22) Filed: Dec. 23, 2014

(65) Prior Publication Data

US 2016/0182474 A1 Jun. 23, 2016

(51) Int. Cl.

*H04L 29/06* (2006.01)
*H04W 12/04* (2009.01)
*H04W 4/14* (2009.01)

(52) U.S. Cl.

CPC ......... *H04L 63/061* (2013.01); *H04L 63/0457* (2013.01); *H04L 63/0876* (2013.01); *H04W 4/14* (2013.01); *H04W 12/04* (2013.01)

(58) Field of Classification Search

CPC ............... H04L 63/061; H04L 63/0457; H04L 63/0876; H04W 4/14; H04W 12/04

USPC .......................................................... 713/165

See application file for complete search history.

(56) References Cited

U.S. PATENT DOCUMENTS 8,185,947 B2 * 5/2012 Kurapati ............... H04L 63/061 380/277
8,542,834 B1 * 9/2013 Feikis ..................... H04L 63/18 375/140
2010/0313019 A1 * 12/2010 Joubert ................. G06F 21/313 713/168
2014/0310765 A1 * 10/2014 Stuntebeck ......... H04L 63/0272 726/1

* cited by examiner

*Primary Examiner* — Michael S McNally

(57) ABSTRACT

Disclosed are various embodiments for facilitating the sharing of files or documents on behalf of a sending user to a recipient user. A secured file is transmitted to a recipient user via a primary communication identifier. A security key that can be utilized to decrypt or unlock the file is transmitted to a secondary communication identifier, which can be automatically identified. In this way, security of the file can be maintained in the event that one of the communications channels corresponding to the primary communication identifier or secondary communication identifier is compromised.

23 Claims, 5 Drawing Sheets

SECONDARY COMMUNICATIONS CHANNEL FACILITATING DOCUMENT SECURITY

BACKGROUND

Users may wish to share documents or other files with other users in a secure manner. In some cases, a user sharing a document may wish to protect the document with a password or key that must be employed by the recipient in order to open or access the document. In some cases, such a password or key can be pre-shared between the sending user and the recipient.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
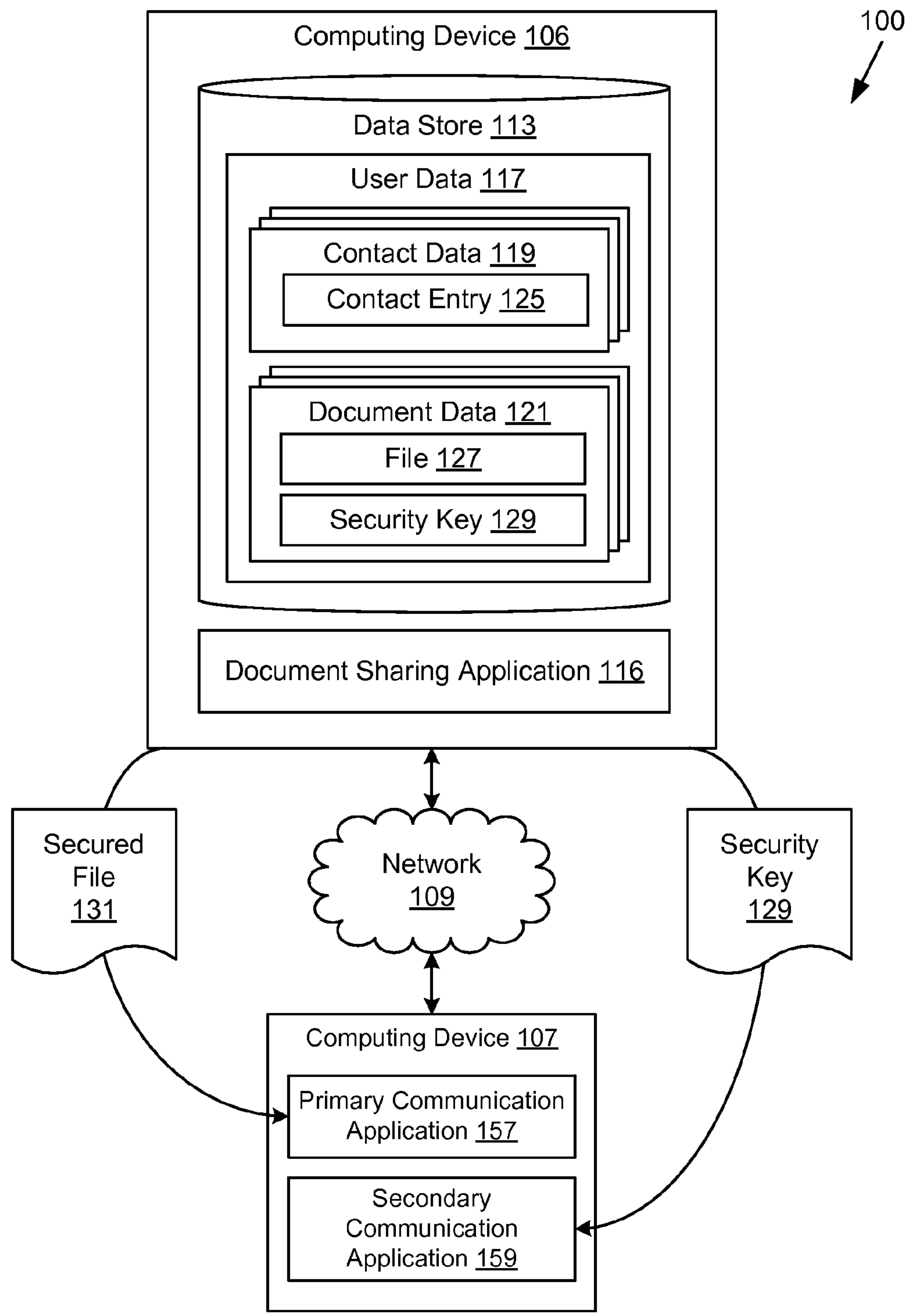
FIG. 1 is a drawing of a networked environment according to various embodiments of the present disclosure.

Users sharing documents or other types of files may wish to secure the contents of those files to prevent access to the files by unauthorized users. Files may be secured by applying an encryption process based upon a security key where the file is encrypted utilizing a security key such that in order to be accessed, the file must be decrypted with the security key. In some scenarios, a user may wish to utilize public key-private key encryption methodologies where a file is encrypted using a public key and must be decrypted using a private key that corresponds to the public key in order for the file to be accessed. Files can also be secured by utilizing a password protection process that may not involve encryption of the file. For example, a binary file that is encoded in a proprietary or open format that is viewable by a reader or editor, such as a file format supported by MICROSOFT WORD, ADOBE ACROBAT, or other software programs, can be password protected such that in order to be accessed using a reader or editor program, a correct password must be supplied by a user attempting to access the file.

Accordingly, the sharing of such files among users of an enterprise or among users of different enterprises often involves the exchange of a secured file that is encrypted or password protected as well as the exchange of a security key, such as a decryption key or a password, that should be used to decrypt or otherwise access or open the file. In many cases, a copy of the file and security key may be shared by a sharing user to a recipient user in an email message, instant message, short message service (SMS) message, or other form of messaging or communication. In some scenarios, a secured file and a corresponding security key may be shared by the user in a single message or communication, which can render the security applied to the file nearly useless if the communication is compromised, as an unauthorized user would then have access to the file as well as the security key that provides the ability for the unauthorized user to access the file.

Accordingly, embodiments of the present disclosure can facilitate the sharing of a file from a sending user to a recipient as well as the sharing of a security key associated with the file in a manner that improves the security of the security key. As one example, a file can be encrypted or otherwise secured using a security key and is selected by a sending user and/or generated on behalf of the sending user. The secured file can be transmitted to the recipient user with which the sending user wishes to share the file using a primary communication identifier, such as an email address that is selected by the sending user. The security key can be transmitted to the recipient user using a secondary communication identifier, such as a phone number, instant messaging user identifier, or any other identifier that corresponds to a communications channel that is separate from the communications channel to which the primary communication identifier corresponds. In this way, embodiments of the disclosure can facilitate the sharing of files among users while facilitating security of a security key that is employed to encrypt and/or secure the file.

With reference to FIG. 1, shown is a networked environment 100 according to various embodiments. The networked environment 100 includes one or more computing devices 106 and 107, which are in data communication with each other via a network 109. The network 109 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks. In the depicted example of FIG. 1, the computing device 106 and 107 are shown merely for illustrative purposes to describe how embodiments of the disclosure may operate. It should be appreciated that computing devices 106, 107 can be deployed in various ways and that the depicted illustration is non-limiting.

Various applications and/or other functionality may be executed in the computing device 106 according to various embodiments. Also, various data is stored in a data store 113 that is accessible to the computing device 103. The data store 113 may be representative of memory of the computing device 106, mass storage resources of the computing device 106, or any other storage resources on which data may be stored by the computing device 106. The data store 113 may also be representative of a plurality of data stores 113 as can be appreciated. The data stored in the data store 113, for example, is associated with the operation of the various applications and/or functional entities described below.

The components executed on the computing device 103, for example, include a document sharing application 116 and other applications, services, processes, systems, engines, or functionality not discussed in detail herein. The document sharing application 116 is executed to facilitate the sharing of documents from a sending user to a recipient user according to various embodiments of the disclosure. Embodiments of the disclosure can also operate to secure a file with a security key and subsequently transmit the secured file and security key to a recipient via separate communications channels. For example, a secured file can be generated by the document sharing application 116 and sent to a recipient's email address while the security key that can be used to unlock or decrypt the secured file can be sent to the recipient's phone number via an SMS message. In this way, the secured file and the security key are sent to the recipient via separate communications channels in order to reduce the possibility that the secured file will be compromised in the event that the email message to which the secured file is attached is compromised.

In some embodiments, the document sharing application 116 can comprise functionality that is embedded within other applications or distributed as a plug-in that is compatible with other software. For example, an email client, such as MICROSOFT OUTLOOK, may include the functionality associated with the document sharing application 116 as described herein as logic that is embedded within the email client or as a third-party plug-in. As another example, the functionality of the document sharing application 116 can be embedded within an application with which a document is created, authored and/or edited, such as MICROSOFT WORD, MICROSOFT POWERPOINT, etc., as logic that is embedded within the software or as a third-party plug-in.

The data stored in the data store 113 includes, for example, user data 117, document data 121, and potentially other data. The user data 117 can include data associated with a user account, such as contact data 119 and potentially other data. In some embodiments, user data 117 can also include email, calendar data or other user data that may be stored on a user's device. For example, user data 117 can also include access settings, such as authentication credentials, delegation settings (e.g., information about other users who may be provided access to the user data 117 of a particular user), user profile information, location data, or any other forms of user data.

Contact data 119 can include personal information manager (PIM) or address book data related to contacts of a particular user. Information about users can be stored as a contact entry 125 and include various communication identifiers that can be used by various applications executed by the computing device 106 in order to communicate with contacts of a user. In the context of this disclosure, a communication identifier can include, for example, internal or external email addresses, telephone numbers, user identifiers associated with social networking or messaging services, mailing addresses, contact notes, and other information associated with contacts that a user may wish to maintain in an address book or contacts store. In some scenarios, a contact entry 125 can also include a user identifier of a particular user within an enterprise storage service. Contact data 119 can also include user specific address book data as well as global address book data for address books that are shared among multiple users in a domain and/or enterprise. Additionally, a contact entry 125 associated with a particular contact of a user can also include data with respect to a frequency or volume of communications with a user as well as which of multiple communication identifiers are most often used to communicate with a particular contact. The contact entry 125 can also include data that identifies which of multiple communication identifiers associated with a contact was most recently used to communicate with a particular contact.

Document data 121 can include one or more files 127 that can be stored on behalf of a user in storage accessible to the computing device 106. Files 127 can represent documents, media, or any other data that can be stored in a file system or storage accessible to the computing device 106. Files 127 can be associated with a security key 129, which can represent a password, encryption key, or any other data that can be used to generate an encrypted or secured version of the file 127.

The computing device 107 is representative one or more computing devices 107 that may be associated with a recipient user to whom a sending user can share a particular file 127 via the document sharing application 116. The computing device 107 may comprise, for example, a processor-based system, such as a computer system, that may be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The computing device 106 may include a display that comprises, for example, one or more devices such as liquid crystal display (LCD) displays, gas plasma-based flat panel displays, organic light emitting diode (OLED) displays, LCD projectors or other types of display devices.

The computing device 107 may be configured to execute various applications, such as a primary communication application 157 and a secondary communication application 159. The primary communication application 157 and secondary communication application 159 can comprise any client that is configured to receive communications that are directed to communication identifiers associated with the recipient user in a contact entry 125 of the sending user. For example, the primary communication application 157 may comprise a mail client that is executed to facilitate access to the email of the recipient user, while the secondary communication application 159 may comprise a messaging application that is executed to facilitate access to the SMS messages of the recipient user. The primary communication application 157 and secondary communication application 159 can also take the forms of other types of applications, such as a social networking application, an instant messaging application, a browser, etc.

The distinction between a primary communication application 157 and secondary communication application 159 is depicted in the drawings merely for illustrative purposes and to indicate that communications initiated by the computing device 106 can be sent to a recipient user and be received in distinct communications channels by the recipient user. In some scenarios, the primary communication application 157, such as an email client, may be executed by one computing device 107, and the secondary communication application 159, such as an SMS application, may be executed by a different computing device 107 associated with the recipient user. In another scenario, the primary communication application 157 or secondary communication application 159 can be executed in separate virtual machines executed by the computing device 107. In yet another scenario, the primary communication application 157 or secondary communication application 159 may comprise an application that communicates with the document sharing application 116 in a secure communications channel such that, for example, an application facilitating decryption of a secured file 131 can extract the security key 129 from the secondary communication application 159 without user intervention.

Next, a general description of the operation of the various components of the networked environment 100 is provided. To begin, the document sharing application 116 can facilitate the sharing of files 127 or documents between a sending user that may be associated with the computing device 106 and a recipient user that may be associated with the other computing device 107 depicted in the example of FIG. 1. Accordingly, the document sharing application 116 can obtain a request to share a file 127 with a recipient user on behalf of a sending user. Such a request can be obtained via a user interface generated by the document sharing application 116 or any other application embedded with logic that generates such a request. For example, a shell command can be included within an operating system that allows a user to initiate a request to share a file 127 via a file explorer. In some embodiments, the document sharing application 116 can be invoked via a website providing access to document data 121 associated with a user, such as a file storage service. In such a scenario, a sharing user can initiate a request to share a file 127 via the document sharing application 116 by following a user interface element or a link provided in a user interface generated by the website.

Upon receiving a request to share a file 127 with another user, such as a recipient user, the document sharing application 116 can identify a primary communication identifier associated with the recipient user. The primary communication identifier can be provided by the sharing user via a user interface. For example, a sharing user can select a file 127 to share with a recipient user and to provide or select an email address of the recipient user. The primary communication identifier can also comprise a phone number or a user identifier in a social networking service, file storage service, file sharing service, messaging service, or any other system in which an identifier can be stored in a contact entry 125 of the recipient user. In some examples, the primary communication identifier may comprise a storage location accessible by a browser or other type of application (e.g., the primary communication application 157), from which the secured file 131 can be retrieved by the computing device 106.

The document sharing application 116 can also generate or obtain the security key 129 that corresponds to the file 127 and from which a secured file 131 can be generated by the document sharing application 116. The security key 129 can comprise an encryption key or password that is either automatically generated by the document sharing application 116 or obtained from the sharing user via a user interface element or an application programming interface (API) call received from another application or service that obtains or generates the security key 129.

The document sharing application 116 can then generate a secured file 131 by securing or encrypting the file 127, which can comprise an encrypted file or a password protected version of the file 127, using the security key 129. The secured file 131 can be transmitted to the primary communication identifier to the computing device 107 associated with the recipient user. The document sharing application 116 can also identify a secondary communication identifier from a contact entry 125 associated with the recipient user. The document sharing application 116 can identify the recipient user by determining whether the primary communication identifier corresponding to the request to share the file 127 is associated with a contact entry 125 that includes other communication identifiers that are separate from the primary communication identifier. In one embodiment, the document sharing application 116 can identify a secondary communication identifier by identifying communication identifiers that are associated with a different type of communication channel relative to a communication channel associated with the primary communication identifier.

For example, should the primary communication identifier represent an email address, the document sharing application 116 can identify a secondary communication identifier by identifying a different email address than the primary communication identifier. As another example, should the primary communication identifier represent an email address, the document sharing application 116 can identify a secondary communication identifier by identifying a mobile phone number or other type of phone number that is associated with a contact entry 125 in which the primary communication identifier is stored. As another example, should the primary communication identifier represent a user identifier in a social networking system, a file storage service, etc., the document sharing application 116 can identify a secondary communication identifier by identifying an email address, a mobile phone number or other type of communication identifier that varies from the primary communication identifier and that is associated with a contact entry 125 in which the primary communication identifier is stored.

Accordingly, the document sharing application 116 can transmit the secured file 131 to the recipient user using the primary communication identifier and the security key 129 needed to access or decrypt the secured file 131 to the recipient user using the secondary communication identifier. In this way, the secured file 131 is not communicated using the same communications channel as the security key 129. Therefore, should the communications channel to which the primary communication identifier corresponds be compromised, the security key 129 may be kept secure as long as the communications channel corresponding to the secondary communication identifier is not also compromised. To this end, the document sharing application 116 can be configured to only transmit the security key 129 using a particular type of communications channel to address security concerns. For example, the document sharing application 116 can avoid sending the security key 129 via electronic mail or to certain electronic mail domains. As another example, the document sharing application 116 can avoid sending the security key 129 using any other type of communications channel that an administrator can deem insecure.

Accordingly, the computing device 107 can receive the secured file 131 via the primary communication application 157, or an application that corresponds to the primary communication identifier. The computing device 107 can receive the security key 129 via the secondary communication application 159, or an application that corresponds to the secondary communication application 159. As noted above, the primary communication application 157 and secondary communication application 159 may be executed by different computing devices 107 associated with the recipient user. For example, a recipient user may receive email on a first computing device 106, such as a personal computer, and receive SMS messages on another computing device, such as a smartphone. In such a scenario, the primary communication application 157 and secondary communication application 159 are executed by different computing devices.

Figure 2:
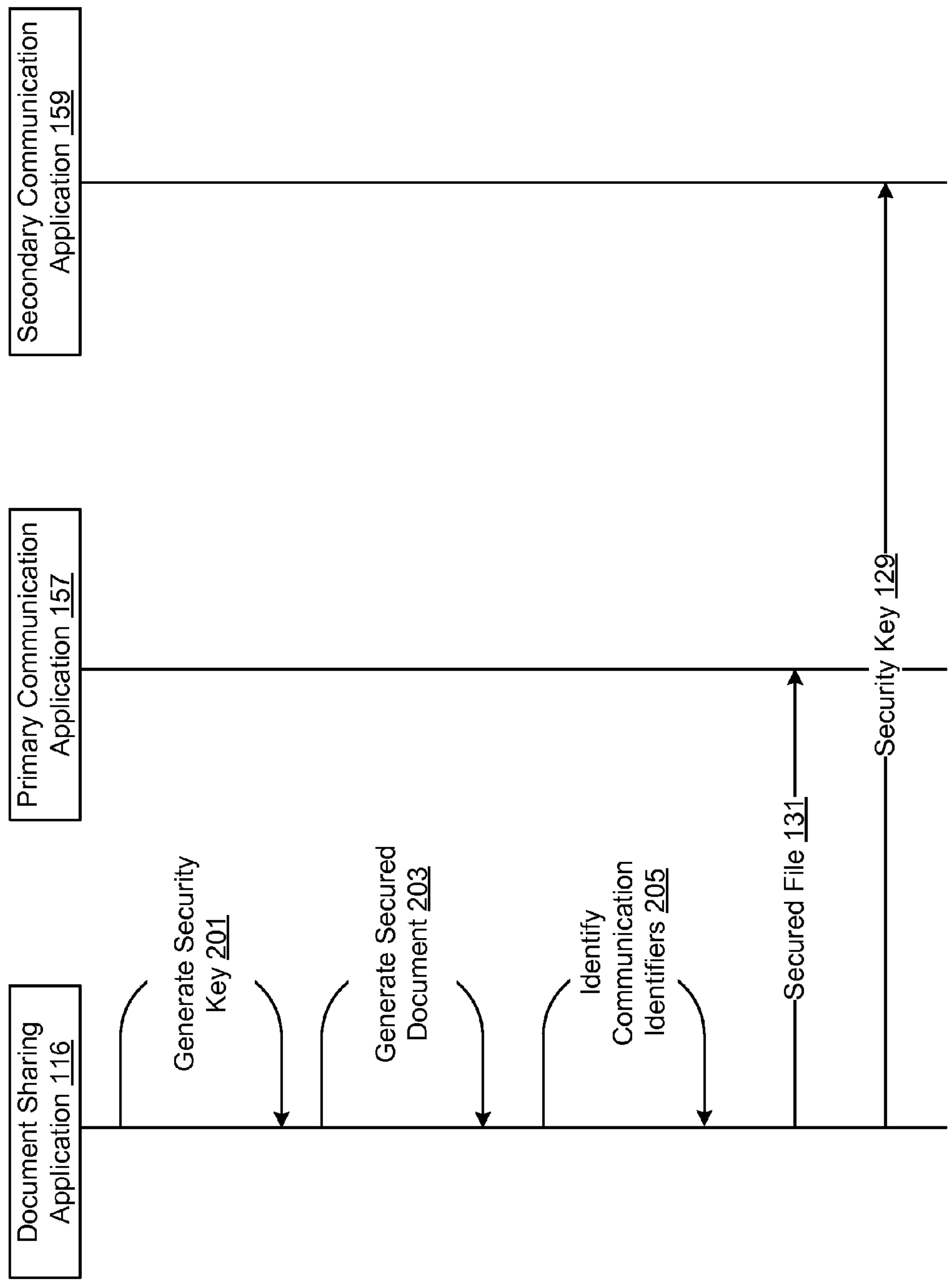
FIG. 2 is a sequence diagram illustrating operation of a client device and/or computing environment in the networked environment of FIG. 1 according to various embodiments of the present disclosure.

Referring next to FIG. 2, shown is an example sequence diagram that illustrates one example of interactions between the various components illustrated in the example networked environment 100 of FIG. 1. FIG. 2 illustrates an example of a computing device 106 that has received a request to share a file 127 on behalf of a sending user. As shown in FIG. 2A, the document sharing application 116 executed by the computing device 106 generates a security key 129 in response to receiving such a request. The security key 129 can be automatically generated by the document sharing application 116 using an algorithm specified by an encryption standard or be supplied by the sending user initiating the request to share a file 127.

The document sharing application 116 can then generate a secured document 203 that corresponds to the file 127 associated with the request. The secured file 131 can be generated using the security key 129 by applying an encryption algorithm or applying a password protection capability supported by the document sharing application 116. The document sharing application 116 can then identify communication identifiers 205 corresponding to the recipient user with which the secured file 131 will be shared. A primary communication identifier with which the secured file 131 is transmitted can be supplied when a sending user initiates the request. In some embodiments, the document sharing application 116 can automatically identify the primary communication identifier as well as the secondary communication identifier based upon a volume or frequency of communications with a particular communication identifier from a contact entry 125 associated with a recipient user.

For example, the document sharing application 116 can select a particular communication identifier from a contact entry 125 associated with the recipient user as the primary communication identifier when the contact entry 125 indicates that the particular communication identifier is associated with the highest volume and/or frequency of communications between the sending user and recipient user. In the event that the sending user selects or supplies the primary communication identifier, the document sharing application 116 can select a particular communication identifier from a contact entry 125 associated with the recipient user as the secondary communication identifier when the contact entry 125 indicates that the particular communication identifier is associated with the highest volume and/or frequency of communications between the sending user and recipient user. In some embodiments, the document sharing application 116 can also receive a selection of the secondary communication identifier from the sending user. In some examples, the document sharing application 116 can be configured to only accept certain types of secondary communication identifiers to which the security key 129 is transmitted to address security concerns. For example, the document sharing application 116 can avoid sending the security key 129 via electronic mail or to certain electronic mail domains. As another example, the document sharing application 116 can avoid sending the security key 129 using any other type of communications channel that an administrator can deem insecure.

Upon identifying the primary communication identifier and secondary communication identifier, the document sharing application 116 can transmit the secured file 131 to the computing device 107, which can receive the secured file 131 via the primary communication application 157. The document sharing application 116 can transmit the security key 129 corresponding to the secured file 131 to the computing device 107 associated with the recipient user to the secondary communication identifier. The computing device 107 can receive the security key 129 via the secondary communication application 159.

Figure 3:
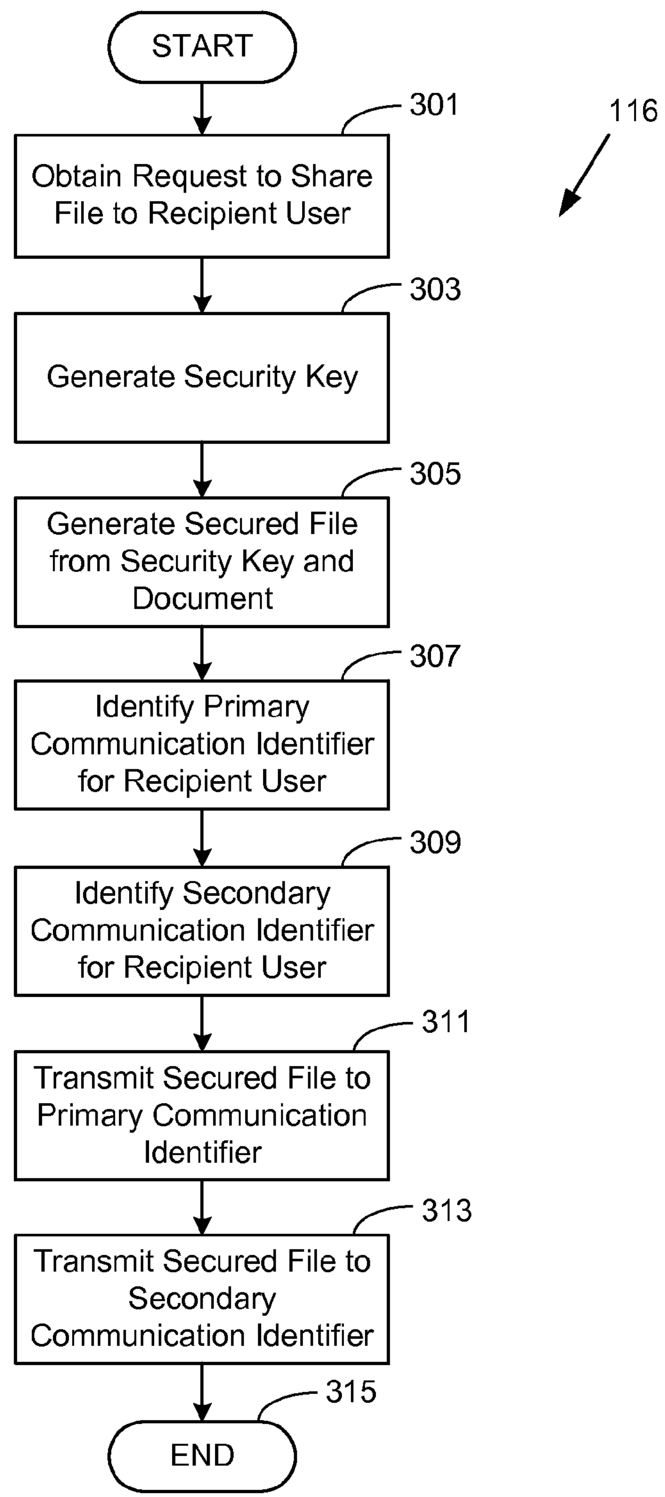
FIG. 3 is a flowchart illustrating one example of functionality implemented as portions of agent application executed in a computing environment in the networked environment of FIG. 1 according to various embodiments of the present disclosure.

Referring next to FIG. 3, shown is a flowchart that provides one example of the operation of a portion of the document sharing application 116 according to various embodiments. It is understood that the flowchart of FIG. 3 provides merely an example of the many different types of functional arrangements that may be employed to implement the operation of the portion of the document sharing application 116 as described herein. As an alternative, the flowchart of FIG. 3 may be viewed as depicting an example of elements of a method implemented in the computing device 106 (FIG. 1) according to one or more embodiments. Functionality attributed to the document sharing application 116 can be implemented in a single process or application executed by the computing device 106 and/or multiple processes or applications. The separation or segmentation of functionality as discussed herein is presented for illustrative purposes only.

Beginning with box 301, the document sharing application 116 can obtain a request to share a file 127 with a recipient user on behalf of a sending user. At box 303, the document sharing application 116 can generate a security key 129 that corresponds to the file 127. As noted above, in some scenarios, the document sharing application 116 can obtain the security key 129 from the sending user. At box 305, the document sharing application 116 can generate a secured file 131 that is based upon the security key 129 and the file 127 that the sending user requested to share with the recipient user. As noted above, the secured file 131 can be encrypted using an encryption algorithm or password protected.

At box 307, the document sharing application 116 can identify a primary communication identifier for the recipient user. The primary communication identifier can be supplied by the sending user or automatically identified by the document sharing application 116. At box 309, the document sharing application 116 can identify a secondary communication identifier associated with the recipient user that is different from the primary communication identifier. At box 311, the document sharing application 116 can transmit the secured file 131 to the primary communication identifier. At box 313, the document sharing application 116 can transmit the security key 129 to the secondary communication identifier. Thereafter, the process can proceed to completion at box 315.

Figure 4:
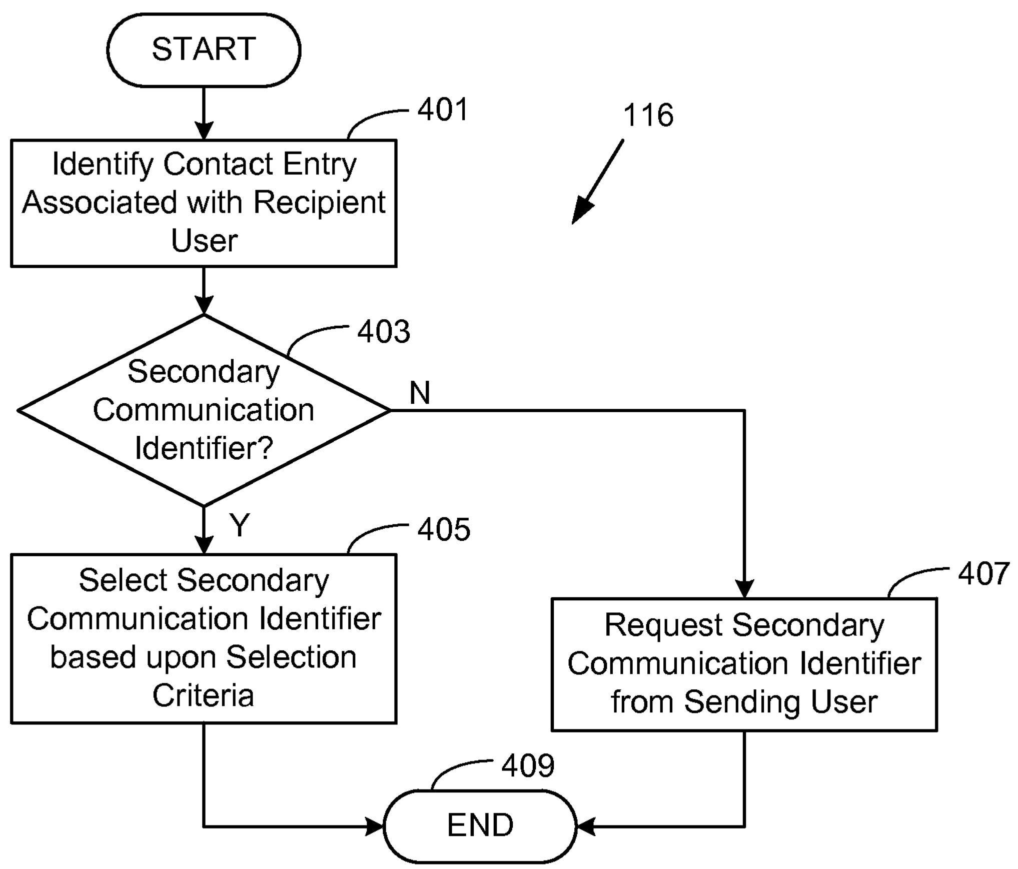
FIG. 4 is a flowchart illustrating one example of functionality implemented as portions of agent application executed in a computing environment in the networked environment of FIG. 1 according to various embodiments of the present disclosure.

Referring next to FIG. 4, shown is a flowchart that provides one example of the operation of a portion of the document sharing application 116 according to various embodiments. It is understood that the flowchart of FIG. 4 provides merely an example of the many different types of functional arrangements that may be employed to implement the operation of the portion of the document sharing application 116 as described herein. As an alternative, the flowchart of FIG. 4 may be viewed as depicting an example of elements of a method implemented in the computing device 106 (FIG. 1) according to one or more embodiments. Functionality attributed to the document sharing application 116 can be implemented in a single process or application executed by the computing device 106 and/or multiple processes or applications. The separation or segmentation of functionality as discussed herein is presented for illustrative purposes only. FIG. 4 illustrates one example of how the document sharing application 116 can automatically identify a secondary communication identifier to which a security key 129 should be transmitted that is different from the primary communication identifier.

Beginning with box 401, the document sharing application 116 can identify a contact entry 125 in contact data 119 or a contacts data store or address book of the sending user, where the contact entry 125 is associated with the recipient user to whom a file is being shared via the document sharing application 116. At box 403, the document sharing application 116 can determine whether the contact entry 125 contains another communication identifier to which the security key 129 can be transmitted that varies from the primary communication identifier. If not, the secondary communication identifier can be obtained from the contact entry 125, then at box 407, the document sharing application 116 can initiate a request for the secondary communication identifier from the sending user.

Otherwise, at box 405, the document sharing application 116 can select a secondary communication identifier based upon selection criteria associated with the document sharing application 116. The selection criteria can be based upon how frequently a computing device 106 of the sending user communicates with a particular communication identifier. For example, a communication identifier having the highest frequency of communications with the computing device 106 over a specified period of time and that varies from the primary communication identifier can be selected as the secondary communication identifier. As another example, the document sharing application 116 can also be configured to always select a particular type of communication identifier as a secondary communication identifier, such as a mobile phone number, an identifier in a particular messaging service, or other type of account of the recipient user. Accordingly, upon selection of the secondary communication identifier, the process can proceed to completion at box 409.

Figure 5:
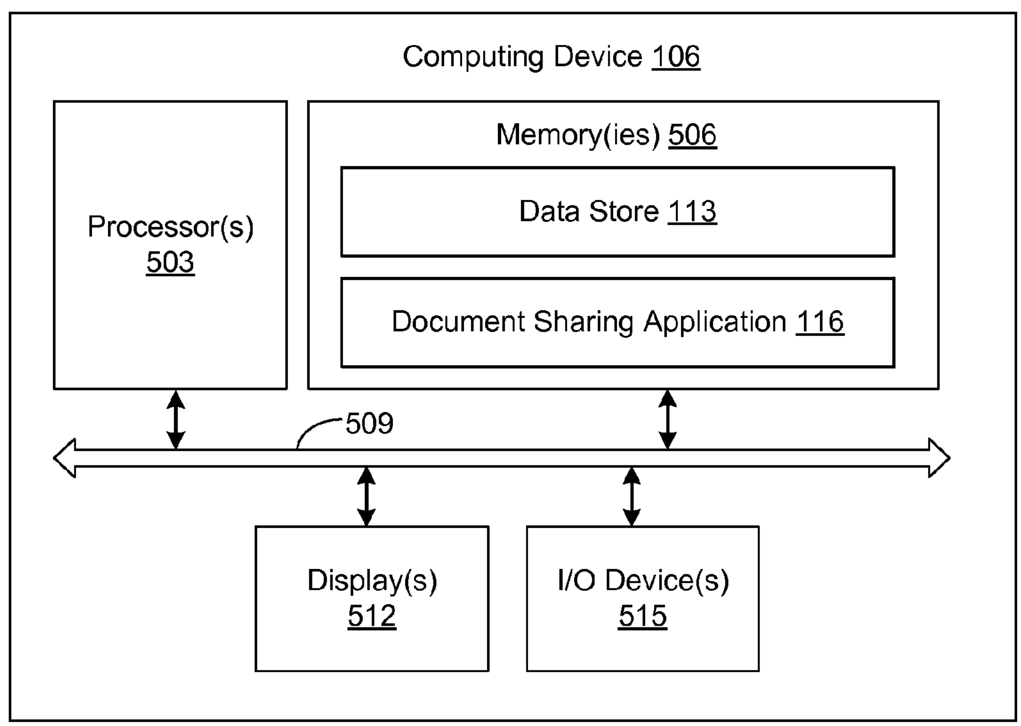
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 106 according to an embodiment of the present disclosure. The computing device 106 includes at least one processor circuit, for example, having a processor 503 and at least one memory device 506, both of which are coupled to a local interface 509, respectively. As such a computing device 106 may comprise, for example, at least one computer, a mobile device, smartphone, computing device 106 or like device. The local interface 509 may comprise, for example, a data bus with an accompanying address/control bus or other bus structure as can be appreciated.

Stored in the memory device 506 are both data and several components that are executable by the processor 503. In particular, stored in the one or more memory device 506 and executable by the processor 503 are the document sharing application 116, and potentially other applications. Also stored in the memory 506 may be a data store 113 and other data.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of one or more of the memory devices 506 and run by the processor 503, code that may be expressed in a format such as object code that is capable of being loaded into a random access portion of the one or more memory devices 506 and executed by the processor 503, or code that may be interpreted by another executable program to generate instructions in a random access portion of the memory devices 506 to be executed by the processor 503, etc. An executable program may be stored in any portion or component of the memory devices 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory devices 506 are defined herein as including both volatile and nonvolatile memory and data storage components. Also, the processor 503 may represent multiple processors 503 and/or multiple processor cores, and the one or more memory devices 506 may represent multiple memories that operate in parallel processing circuits, respectively. The memory devices 506 can also represent a combination of various types of storage devices, such as RAM, mass storage devices, flash memory, hard disk storage, etc. In such a case, the local interface 509 may be an appropriate network that facilitates communication between any two of the multiple processors 503, between any processor 503 and any of the memory devices 506, etc. The local interface 509 may comprise additional systems designed to coordinate this communication, including, for example, performing load balancing. The processor 503 may be of electrical or of some other available construction.

The computing device 106 may include a display 512 upon which a user interface generated by the document sharing application 116 or another application can be rendered. The computing device 106 may also include one or more input/output devices 515 that may include, for example, a capacitive touchscreen or other type of touch input device, fingerprint reader, keyboard, etc.

Although the document sharing application 116 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-4 show an example of the functionality and operation of an implementation of portions of the document sharing application 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4 show a specific order of execution, it is understood that the order of execution may differ from that which is depicted. For example, the order of execution of two or more blocks may be scrambled relative to the order shown. Also, two or more blocks shown in succession in FIGS. 3-4 may be executed concurrently or with partial concurrence. Further, in some embodiments, one or more of the blocks shown in FIGS. 3-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the document sharing application 116, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the document sharing application 116, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 106, or in multiple computing devices 106. Additionally, it is understood that terms such as "application," "service," "system," "engine," "module," and so on may be interchangeable and are not intended to be limiting.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program, when executed by the computing device, being configured to cause the computing device to at least:

identify a request on behalf of a sending user to transmit a file to a recipient, the request being associated with a primary communications identifier;

identify a secondary communications identifier associated with the recipient;

identify a security key associated with the file;

transmit the file to the recipient using the primary communications identifier; and transmit the security key to the recipient using the secondary communications identifier, wherein the secondary communications identifier associated with the recipient is extracted from a contact entry associated with the recipient from a plurality of contacts accessible to the computing device.

2. The non-transitory computer-readable medium of claim 1, wherein the program causes the computing device to encrypt the file using the security key.

3. The non-transitory computer-readable medium of claim 1, wherein the primary communications identifier is associated with a first communications channel that is separate from a second communications channel associated with the secondary communications identifier.

4. The non-transitory computer-readable medium of claim 1, wherein the primary communications identifier comprises an email address and the file is transmitted as an attachment to an email message transmitted to the email address.

5. The non-transitory computer-readable medium of claim 1, wherein the primary communications identifier identifies a storage location accessible to the recipient.

6. The non-transitory computer-readable medium of claim 1, wherein the secondary communications identifier associated with the recipient comprises a phone number and the security key is transmitted to the phone number via a short message service (SMS) message.

7. The non-transitory computer-readable medium of claim 1, wherein the primary communications identifier is supplied in the request to transmit the file to the recipient.

8. The non-transitory computer-readable medium of claim 1, wherein the primary communications identifier comprises a user identifier in an enterprise storage system.

9. The non-transitory computer-readable medium of claim 1, wherein the secondary communications identifier associated with the recipient is determined based at least in part upon a frequency of communications between the sending user and the recipient via a plurality of communications identifiers associated with the recipient.

10. The non-transitory computer-readable medium of claim 1, further comprising a second non-transitory computer-readable medium associated with the recipient, the second non-transitory computer-readable medium comprising instructions which, when executed by a processor:

automatically extract the security key from a communications channel associated with the secondary communications identifier, without user interaction; and decrypt the file using the security key.

11. A system, comprising:

a client device including a processor and a memory, wherein the processor and the memory are configured to:

receive a request on behalf of a sending user to initiate sharing of a file with a recipient user;

obtain a security key associated with the file;

generate a secured file from the file using the security key;

obtain a primary communication identifier and a secondary communication identifier associated with the recipient user, the secondary communication identifier associated with a separate communication medium relative to the primary communication identifier;

transmit the secured file to the recipient user using the primary communication identifier; and transmit the security key to the recipient user using the secondary communication identifier, wherein:

the primary communication identifier is obtained from the sending user; and obtaining the secondary communication identifier comprises identifying a communication identifier associated with the recipient user that is different from the primary communication identifier from a contact entry associated with the recipient user.

12. The system of claim 11, wherein the processor and the memory are further configured to obtain a password from the sending user.

13. The system of claim 11, wherein the processor and the memory are further configured to automatically generate a password on behalf of the sending user.

14. The system of claim 11, wherein generating the secured file further comprises applying a password protection scheme to the file based at least in part upon the security key.

15. The system of claim 11, wherein generating the secured file comprises encrypting the file using the security key.

16. The system of claim 11, wherein the contact entry is stored among a plurality of contacts associated with the sending user.

17. The system of claim 11, further comprising a recipient device, wherein the recipient device is configured to:

automatically extract the security key from the separate communication medium, without user interaction; and decrypt the file using the security key.

18. A method, comprising:

obtaining, within a computing device, a request to share a file on behalf of a sending user with a recipient user, the request comprising a primary communication identifier with which to transmit a reference to the file;

identifying, by the computing device, a secondary communication identifier associated with the recipient user, wherein the primary communication identifier is associated with a first communications channel separate from a second communications channel associated with the secondary communication identifier;

transmitting, from the computing device, a secured file corresponding to the file to the primary communication identifier via the first communications channel; and transmitting, from the computing device, a security key associated with the file to the secondary communication identifier via the second communications channel, wherein:

identifying the secondary communication identifier further comprises identifying a communication identifier from a contact entry associated with the recipient user that is different from the primary communication identifier.

19. The method of claim 18, further comprising:

generating, by the computing device, the security key associated with the file; and generating, by the computing device, the secured file based at least in part upon the security key.

20. The method of claim 18, wherein identifying the secondary communication identifier further comprises identifying a communication identifier from a contact entry associated with the recipient user that is different from the primary communication identifier and based at least upon a volume of communications with the communication identifier from the contact entry.

21. The method of claim 18, wherein identifying the secondary communication identifier further comprises identifying a communication identifier from a contact entry associated with the recipient user with which the computing device has communicated most recently other than the primary communication identifier.

22. The method of claim 18, wherein transmitting the security key to the secondary communication identifier via the secondary communications channel further comprises transmitting a short message service (SMS) message to a phone number corresponding to the recipient user, wherein the SMS message includes the security key.

23. The method of claim 18, further comprising:

receiving, by a recipient device associated with the recipient user, the security key over the second communications channel;

automatically extracting, by the recipient device, the security key from the second communications channel, without user interaction; and decrypting, by the recipient device, the file using the security key.

* * * * *